United States Patent
Vallabh et al.

(10) Patent No.: US 10,384,745 B1
(45) Date of Patent: Aug. 20, 2019

(54) SLEDS AND OTHER RECREATIONAL VEHICLES WITH A BUILT-IN SELFIE WINDOW

(71) Applicants: Amit Jay Vallabh, Newton, MA (US); Rajesh Vallabh, Newton, MA (US)

(72) Inventors: Amit Jay Vallabh, Newton, MA (US); Rajesh Vallabh, Newton, MA (US)

(*) Notice: Subject to any disclaimer, the term of this patent is extended or adjusted under 35 U.S.C. 154(b) by 219 days.

(21) Appl. No.: 15/134,374

(22) Filed: Apr. 20, 2016

Related U.S. Application Data (60) Provisional application No. 62/149,884, filed on Apr. 20, 2015, provisional application No. 62/181,183, filed on Jun. 17, 2015.

(51) Int. Cl.
| | | |
|---|---|---|
| B63B 7/08 | (2006.01) | |
| B62B 15/00 | (2006.01) | |
| B63B 35/71 | (2006.01) | |
| B62B 17/06 | (2006.01) | |
| B60R 11/04 | (2006.01) | |

(52) U.S. Cl.
CPC ............ B63B 7/085 (2013.01); B60R 11/04 (2013.01); B62B 15/006 (2013.01); B62B 17/06 (2013.01); B63B 7/08 (2013.01); B63B 35/71 (2013.01); *B63B 2035/715* (2013.01)

(58) Field of Classification Search
CPC .......... B63B 7/08; B63B 7/085; B63B 35/71; B63B 2035/715; B62B 15/006; B62B 17/06; B60R 11/04
See application file for complete search history.

(56) References Cited

U.S. PATENT DOCUMENTS

| | | | | |
|---|---|---|---|---|
| 4,856,087 A | * | 8/1989 | Nesbit | H04B 1/08 455/344 |
| 5,127,860 A | * | 7/1992 | Kraft | B63B 35/7933 441/74 |
| 5,476,404 A | * | 12/1995 | Price | A47C 15/006 441/126 |
| 6,386,382 B1 | * | 5/2002 | McCausland | A45C 11/22 206/811 |
| 7,131,876 B2 | * | 11/2006 | Hattori | B63B 35/731 440/1 |
| D649,925 S | * | 12/2011 | Allison | D12/317 |
| 8,751,158 B2 | * | 6/2014 | Kamio | B63B 35/731 701/21 |
| 9,032,891 B2 | * | 5/2015 | Kinoshita | B63B 17/00 114/343 |
| 9,090,317 B2 | * | 7/2015 | Mulvihill | B63B 35/73 |
| 9,516,949 B2 | * | 12/2016 | Harkrider | A47C 15/006 |
| 9,833,685 B2 | * | 12/2017 | Tomer | A63C 5/003 |
| 2008/0080734 A1 | * | 4/2008 | Forth | H04R 1/021 381/386 |

OTHER PUBLICATIONS

Selfie Stick Sledding. Reddit.com. Submitted Sep. 2015.
Universal Waterproof Case, JOTO Cell Phone Dry Bag for Apple iPhone 6S. Amazon.com. Webpage retrieved Jul. 3, 2016.

* cited by examiner

*Primary Examiner* — Ajay Vasudeva (57) ABSTRACT

Sleds and other recreational vehicles rideable or otherwise usable by one or more users with a built-in holder for a smartphone or other camera-equipped device to facilitate taking selfie and/or ahead-looking pictures or video while the one or more users are using the recreational vehicle.

16 Claims, 13 Drawing Sheets

SLEDS AND OTHER RECREATIONAL VEHICLES WITH A BUILT-IN SELFIE WINDOW

RELATED APPLICATIONS

The present application is based on and claims priority to U.S. Provisional Patent Application No. 62/149,884 entitled SLEDS AND OTHER RECREATIONAL VEHICLES WITH BUILT-IN SELFIE WINDOW AND ASSOCIATED METHODS filed on Apr. 20, 2015 and U.S. Provisional Patent Application No. 62/181,183 entitled SLEDS AND OTHER RECREATIONAL VEHICLES AND ASSOCIATED METHODS filed on Jun. 17, 2015, both of which applications are hereby incorporated by reference.

BACKGROUND

The present application relates generally to sleds and other recreational vehicles rideable or otherwise usable by one or more users with a smartphone holder for taking selfie and other videos and pictures.

BRIEF SUMMARY

Various embodiment disclosed herein relate to sleds and other recreational vehicles rideable or otherwise usable by one or more users with a built-in holder for a smartphone or other camera-equipped device to facilitate taking selfie and/or ahead-looking pictures or video while the one or more users are using the recreational vehicle.

In accordance with one or more embodiments, a recreational vehicle rideable or otherwise usable by one or more users is disclosed. The vehicle includes a vehicle body including a portion on or in which one or more users may be positioned during use. The vehicle body includes a window structure therein with a built-in mechanism for releasably or removably holding an electronic device of one of said one or more users. The electronic device having one or more cameras. The window structure includes one or more open or optically clear areas enabling the one or more cameras to take selfie videos or photographs and/or ahead-looking videos or photographs while the vehicle is traveling with the one or more users.

In accordance with one or more embodiments, a method is disclosed of using a vehicle at an amusement park ride. The vehicle includes a vehicle body including a portion on or in which a user may be positioned during use and a window structure in the vehicle body with a built-in mechanism for releasably holding an electronic device of the user having one or more cameras. The window structure includes one or more open or optically clear areas enabling the one or more cameras to take selfie videos or photographs and/or ahead-looking videos or photographs while the vehicle is traveling with the user. The method includes the steps of: (a) activating the one or more cameras to take selfie and/or ahead-looking videos or photographs; (b) releasably locking the electronic device in the window structure of the vehicle; (c) traveling on the vehicle through the ride while the one or more cameras capture selfie videos or photographs and/or ahead-looking videos or photographs; and (d) removing the electronic device from the window structure after the ride.

An inflatable vehicle in accordance with one or more further embodiments is usable by one or more users. The vehicle includes a vehicle body including a tubular element extending at least partly around the periphery of the vehicle body; and a window structure in the tubular element of the vehicle body with a built-in mechanism for releasably locking therein an electronic device of one of said one or more users. The electronic device has one or more cameras. The window structure includes one or more open or optically clear areas enabling the one or more cameras to take selfie videos or photographs and/or ahead-looking videos or photographs while the vehicle is traveling with the one or more users. The window structure is recessed in the tubular element to protect the electronic device from any impacts during use of the vehicle.

A system is disclosed in accordance with one or more embodiments enabling amusement parks (such as, e.g., water parks) to transmit images or videos of a rider traveling on a ride (such as, e.g., a wetted slide), includes: a reader at the start of the ride for automatically receiving a unique identifier associated with a rider when the rider is at the start of the ride; one or more cameras installed at one or more locations along the ride to capture pictures or videos of the rider as the rider travels on the ride; a computer system communicating with the reader and the one or more cameras over a network, said computer system receiving information on the unique identifier of the rider from the reader and associating pictures or videos of the rider captured by the one or more cameras with the unique identifier of the rider; and making the pictures or videos of the rider accessible to the rider.

DETAILED DESCRIPTION

Smartphones such as, e.g., iPhone and Android-based devices, typically have both front-facing and rear-facing cameras. The front-facing camera (also sometimes called the selfie camera) has a camera lens facing the user on the same side as the user interface screen, allowing the user to take a selfie, i.e., a photograph or video of at least himself or herself while observing an image of himself or herself on the screen. The rear-facing camera has a camera lens that faces away from the user, allowing the user to take ahead-looking video and pictures (i.e., of what the user sees) like a regular digital camera.

Disclosed herein are sleds and other recreational vehicles that are rideable or otherwise useable by a user having a built-in selfie window, i.e., a window or opening in the sled with a holder that is designed to securely and safely hold a smartphone or other camera device while enabling a user to take a selfie video or picture using the front-facing camera of the smartphone while riding or using the sled. The selfie window can also allow the user to take ahead-looking videos and pictures (i.e., a video or picture of what the user sees using the rear-facing camera of the smartphone) by switching to the rear camera mode of the smartphone. The two cameras can be operated at separate times or even at the same time (e.g., using a so-called front-back camera app downloaded on the smartphone, which shows images or video captured by each camera at the same time on different portions of the screen). The holder also provides a convenient place for a user to safely stow the smartphone while using the sled.

In one or more embodiments, the selfie window is provided in snow sleds. Selfie windows in accordance with various embodiments may also be used in a variety of other recreational equipment a user may ride or otherwise use including, but not limited to, recreational vehicles used in water (inflatable or otherwise) such as equipment to be towed in water by watercraft (sometimes referred to as a 'towable') or for other use in water such as, e.g., river tubing or waterpark tubing. In accordance with one or more further embodiments, selfie windows can also be implemented in paddleboards as well as in boats such as, e.g., kayaks, rowboats, banana boats, and paddleboats.

Also, while various embodiments disclosed herein mainly refer to a smartphone used in the selfie window, it should be understood that this is only by way of example. A variety of portable devices equipped with one or more cameras can also be used including, but not limited to, tablet computers (such as the iPad tablet), GoPro-type and other digital cameras, and iPod and other media players.

Figure 1:
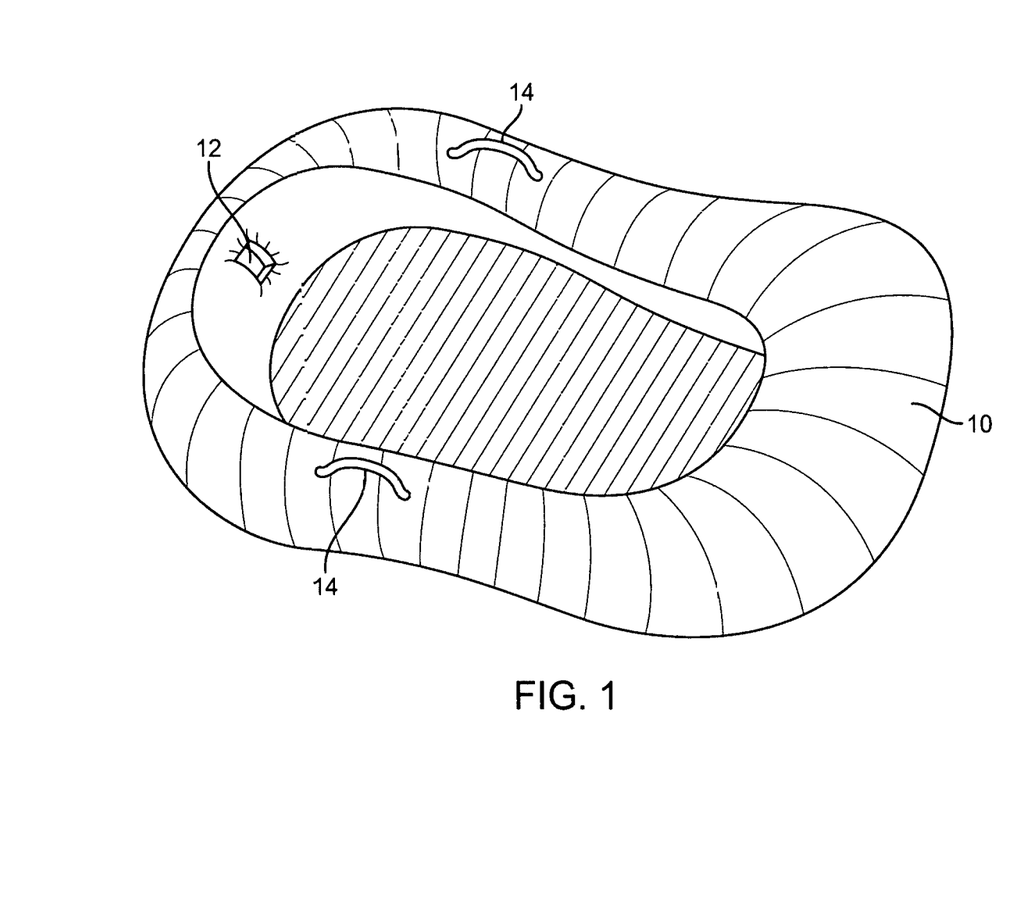
FIG. 1 is a perspective view of an exemplary sled with a built-in selfie window structure in accordance with one or more embodiments.

FIG. 1 illustrates an exemplary sled 10 having a selfie window structure 12 at the front of the sled in accordance with one or more embodiments. The FIG. 1 sled is an inflatable sled, having a generally tubular body shape, in or on which a rider may lie, sit, kneel, stand, or be otherwise positioned. The sled includes handles 14 at opposite sides on a peripheral tube element, which may be gripped by the user.

The sled 10 may be made from a variety of materials commonly used for inflatable sleds including, e.g., rubber, vinyl, Polyvinyl chloride or PVC. In one exemplary embodiment, the sled is made from a Slick Heavy-Gauge 6P PVC with Cold-Crack Additive. In another exemplary embodiment, the sled is made from HYPALON, a trademark for chlorosulfonated polyethylene (CSPE) synthetic rubber (CSM). A sheath such as a Nylon cover may optionally cover the sled. These particular materials are by way of example only as various other types of suitable materials are possible.

Figure 2A:
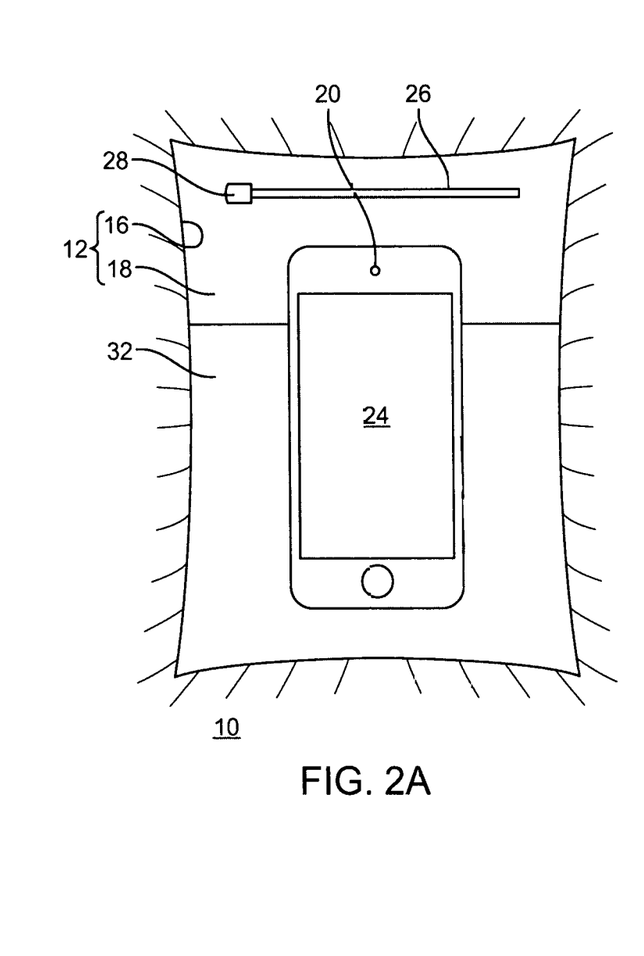
FIG. 2A is an enlarged front view of the selfie window in the sled of FIG. 1.
Figure 2B:
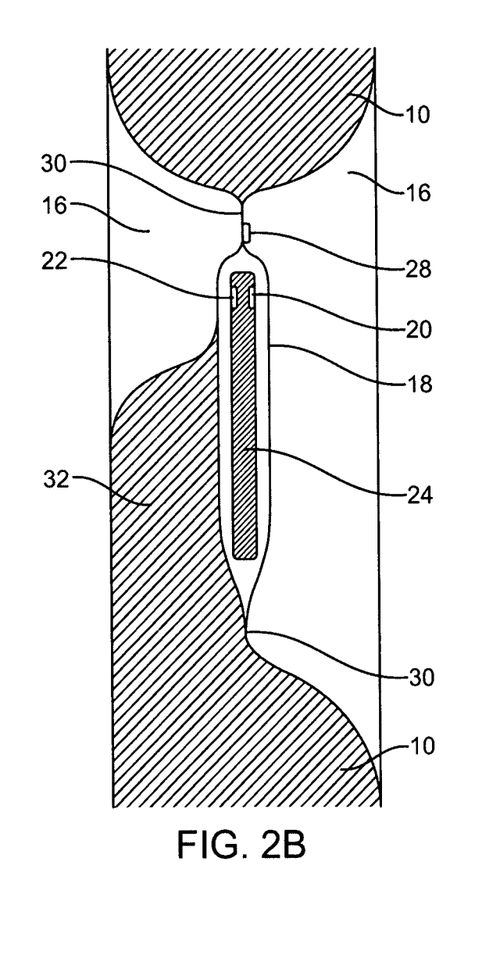
FIG. 2B is a cross-section view taken of the selfie window of FIG. 2A.

FIGS. 2A and 2B illustrate the selfie window 12 of the sled 10 in greater detail. The selfie window 12 includes an opening 16 extending thru the front of the sled and a built-in smartphone (or other camera device) holder 18 therein. The window extends through a front portion of the sled and is configured such that at least the front-facing camera lens 20 and the rear-facing camera lens 22 of the smartphone 24 have a generally clear view and are not visually obstructed, allowing the smartphone 24 to be used for taking both selfie and ahead-looking videos and pictures (at different times or at the same time).

In this exemplary embodiment, the holder 18 comprises a plastic pouch made of two sheets of clear transparent flexible plastic (one overlaid on the other) that are sealed around their periphery to form a pocket for holding the smartphone 24. An opening 26 is provided in one or both sheets enabling the user to access the pocket to insert or remove the smartphone 24.

In one or more embodiments, the pouch opening 26 may be closed using a fastener 28 such as, e.g., a Ziploc fastener. Other possible fasteners include, but are not limited to, a snap fastener, a zipper, a magnetic fastener, a hook-and-loop fastener, a seal-lock mechanism, or a plastic buckle.

In one or more embodiments (not shown), one plastic sheet has a portion folded over the other to form a flap covering the opening through which the user may access the pocket to insert or remove the smartphone without using a fastener.

The plastic sheets can be electronically or heat welded at their edges 30 to the portion of the sled body defining the window to secure the pouch in the window.

In one exemplary embodiment, the pouch comprises a waterproof or watertight compartment for protecting the smartphone 24 from damage due to liquid exposure. By way of example, the pouch may be similar in construction to portable waterproof pouches or cases available for smartphones including, by way of non-limiting example, waterproof smartphone bags from JOTO and KONA, among others. The pouch opening can be sealed close using a seal lock mechanism or a Ziploc fastener in such exemplary bags.

The plastic material forming the pouch preferably enables the user to still use the touch-screen functionality of the smartphone when in the pouch.

By way of example, the pouch may have dimensions of about 8 inches by 4 inches to accommodate a variety of smartphone sizes. Other size pouches can also be used, e.g., larger sizes to also accommodate tablets, and smaller sizes to accommodate smaller phones, digital cameras, smartwatches, etc. It is possible to use different sized pouches to hold different sized smartphones.

In accordance with one or more embodiments, the smartphone holder may comprise a clear rigid plastic case that includes a lid that may be pivoted or slid open to insert the smartphone into or remove the smartphone from the case.

In one or more embodiments, the plastic sheets forming the holder can be replaced at least in part by or be reinforced with an optically clear (at least around the camera lens) hard (or harder) material such as, e.g., Plexiglas or plastic to provide additional protection for the smartphone. In one or more embodiments, the side of the holder facing the front of the sled includes Plexiglas or other material harder than a plastic sheet, while the opposite side of the holder facing the user comprises a flexible plastic sheet, enabling the user to use the touch screen functionality of the smartphone while it is in the holder.

The smartphone holder is preferably recessed within the window in the sled from both the front and the back of the sled as shown in FIG. 2B. This helps prevent the smartphone from being impacted during use by the user or by substances encountered in front of the sled.

Since the lenses 20, 22 on smartphones 24 are ordinarily at or near the top of smartphones, the selfie window can be configured such that a substantial portion of at least the rear of the smartphone 24 is covered by an inflatable portion of the sled (or other padding material) for protection from impacts, without obstructing the camera lenses. In the exemplary embodiment illustrated in FIGS. 1-3, about 40-90% (e.g., 70%) of the rear of the smartphone 24 is covered by inflatable material 32, while the front of the smartphone 24 is largely uncovered to enable a user to access the smartphone touchscreen. In alternate embodiments, a substantial portion of the of the front of the smartphone 24 is also covered by inflatable or other padding material.

Figure 3:
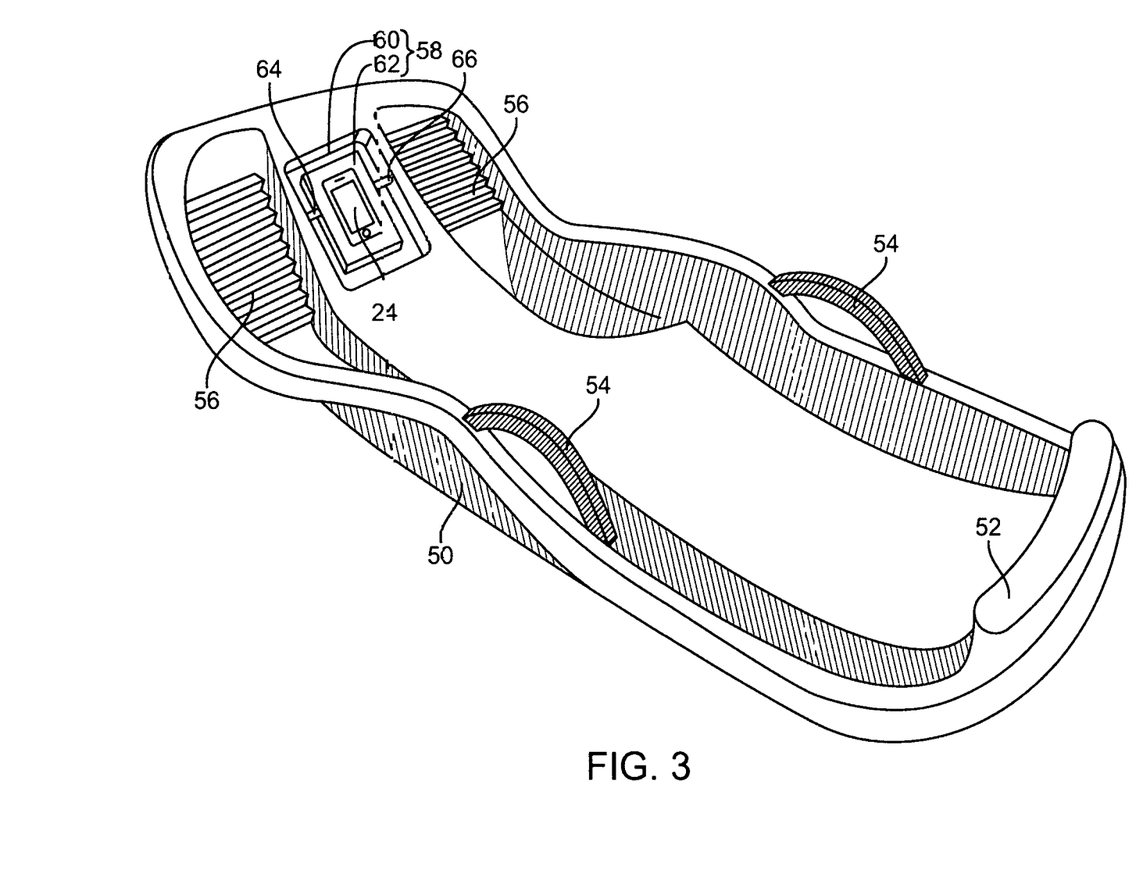
FIG. 3 is a perspective view of another exemplary sled with a built-in selfie window in accordance with one or more embodiments.

FIG. 3 illustrates an alternative sled 50 in accordance with one or more embodiments. The sled 50 may be a snow sled comprising a solid (i.e., non-inflatable) molded plastic structure. It includes a backrest 52, handles 54, and footrests 56. The sled 50 includes a selfie window 58 comprising an opening 60 extending therethrough, and a smartphone holder 62 at the opening. The holder 62 is preferably recessed within the sled body from both sides to help protect the smartphone 24. In accordance with one or more embodiments, the holder 62 comprises a clear rigid plastic case that includes a lid that may be pivoted or slid open to insert the smartphone into or remove the smartphone from the case.

In accordance with one or more embodiments, as shown in FIG. 3, the smartphone holder 62 is pivotable about a horizontal axis within the window by the user to adjust the camera angle. The smartphone pivoting mechanism comprises pins 64 extending from the sides of the holder 62 that are pivotably mounted in respective sockets 66 or bearings in the sled body. The pivoting mechanism may use detents to enable the holder to be releasably locked in one of multiple discrete angular positions.

In accordance with one or more alternate embodiments, the smartphone holder in the sled 50 may be similar to the holders disclosed above in connection with sled 10.

The snow and other sleds described herein can have a variety of alternate shapes and configurations not shown in the drawings. Such alternate shapes and configurations can include, e.g., a tubular shape, a figure-8 shape, a triangular shape, a rectangular shape, an animal or character shape, an automobile or truck shape, etc. These particular shapes are by way of example only and not intended to be limiting.

In accordance with one or more alternate embodiments, the smartphone holder is recessed in the interior body of the sled, but there is no window extending completely thru the sled. In this case, only the selfie camera is useable unless the front of the sled comprises a clear transparent material.

In one or more alternate embodiments, the smartphone holder is recessed in the outer body of the sled, but there is no window extending completely thru the sled. In this case, the smartphone camera can be used to take pictures or video of what the user sees or the surrounding environment, rather than selfies.

Figure 4:
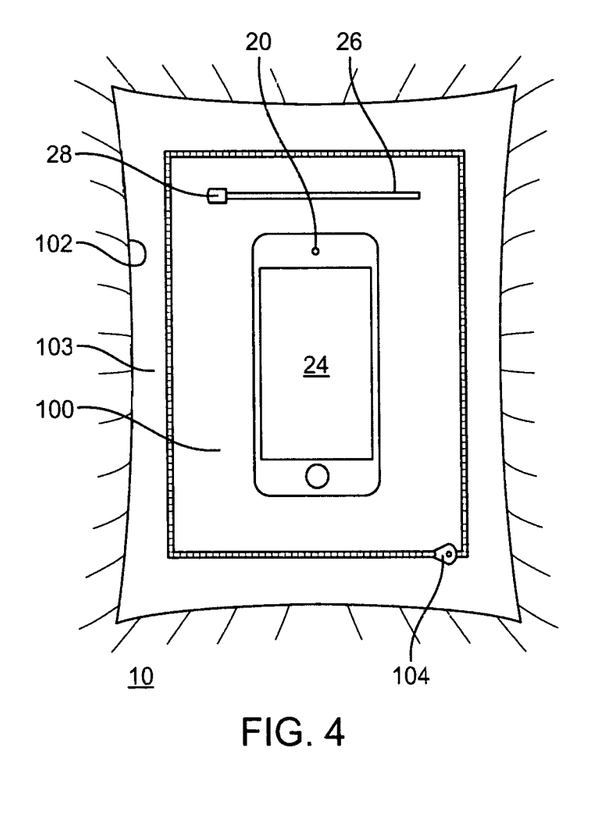
FIG. 4 is an enlarged front view of another selfie window in accordance with one or more embodiments.

In accordance with one or more embodiments, as shown in the example illustrated in FIG. 4, a smartphone holder 100 is removably attached in the opening 102 in the sled 10. The holder 100 may be similar to the holders described above (e.g., the waterproof plastic pouch as shown in FIG. 4 or alternately the more rigid plastic case). In the FIG. 4 illustration, the holder 100 is releasably secured to a frame 103 attached to and extending around the periphery of the opening 102 in the sled using a zipper 104. Various other types of fasteners are also possible for releasably attaching the holder at the opening including, e.g., a snap fastener, a Ziploc fastener, a magnetic fastener, a hook-and-loop fastener, or a plastic buckle.

A removable smartphone holder enables the holder to be easily and inexpensively replaced in case of damage to the holder. It is also possible to provide different-sized interchangeable removable holders all fittable at the same sled opening, and optionally configured to hold different sized/shaped smartphones and other camera-equipped devices. In one or more embodiments, each sled may be part of a kit also having a plurality of such interchangeable removable holders.

Figure 5:
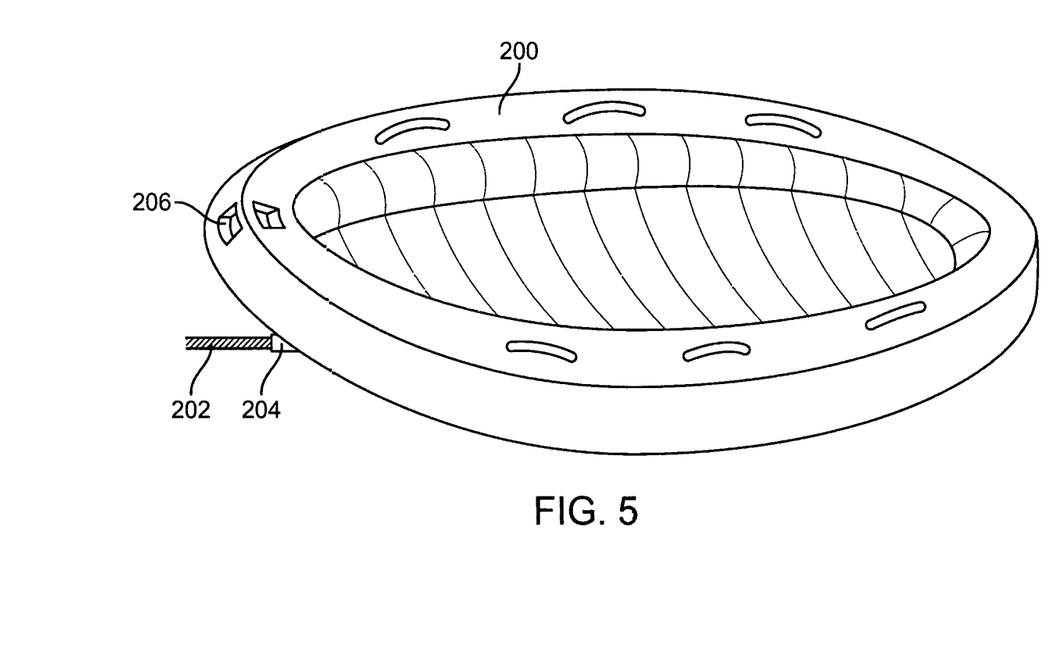
FIG. 5 is a perspective view of another exemplary sled with a built-in selfie window in accordance with one or more embodiments.
Figure 6A:
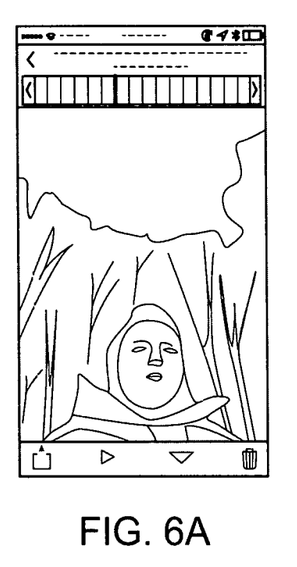
FIGS. 6A-6D are screenshots of frames from an exemplary selfie video made using a snow sled with a built-in selfie window in accordance with one or more embodiments.
Figure 6B:
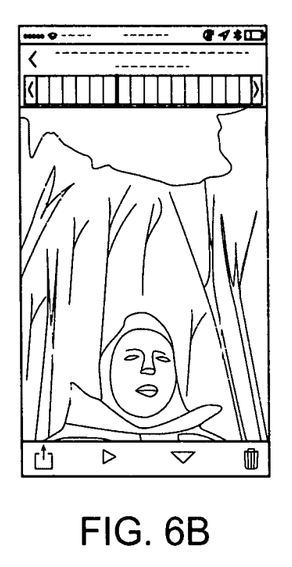
Figure 6C:
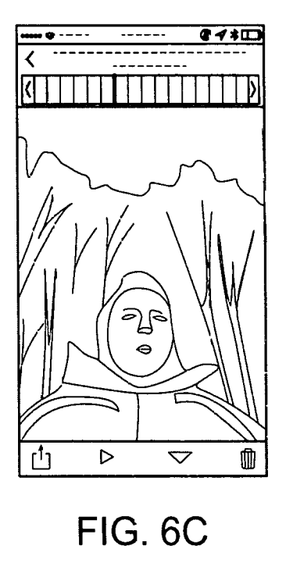
Figure 6D:
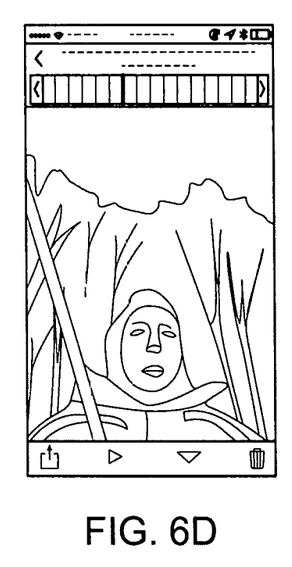

FIG. 5 illustrates an example of a towable sled 200 in accordance with one or more embodiments. A rope 202 is attached at the front of the sled 200 using a clip 204 or other fastener for towing by a boat or other watercraft. The sled 200 includes a selfie window 206 for holding a smartphone or other camera-equipped device. The selfie window 206 with holder may be similar in construction to any of the selfie windows described herein.

In accordance with one or more embodiments, a sled with a selfie window can be used as follows. The user (1) places a smartphone in a built-in smartphone holder and closes the pouch opening, or puts the smartphone in a removable holder and secures the holder into the sled, (2) activates one or more cameras on the smartphone (the selfie camera, the rear camera, or both), and (3) rides the sled while the one or more cameras are recording videos or taking pictures. The order of steps (1) and (2) can be reversed. The user can then save, view, share (e.g., by email, text messaging, social media apps), or delete the captured video and pictures.

Figure 7:
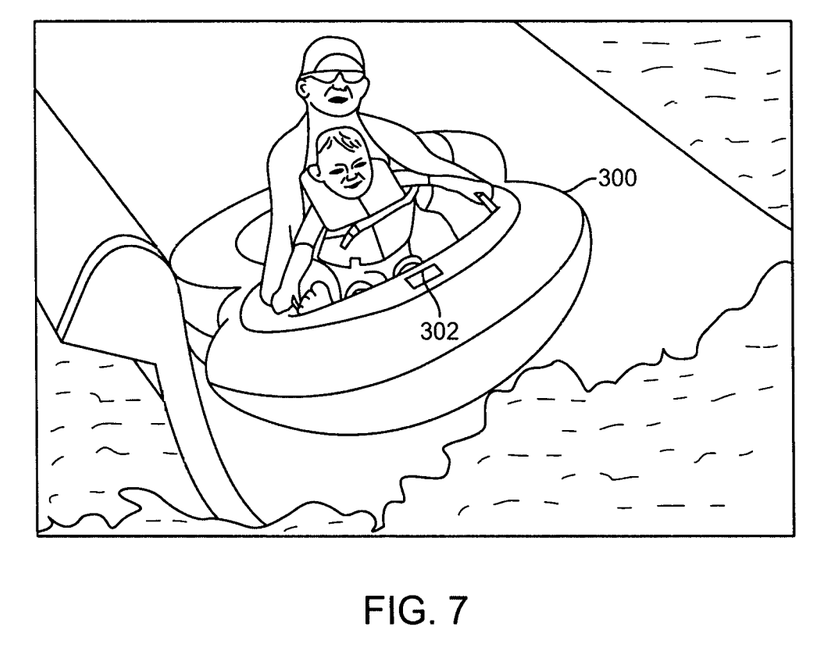
FIGS. 7-9 illustrate exemplary inflatable tube sleds in accordance with one or more embodiments.
Figure 8:
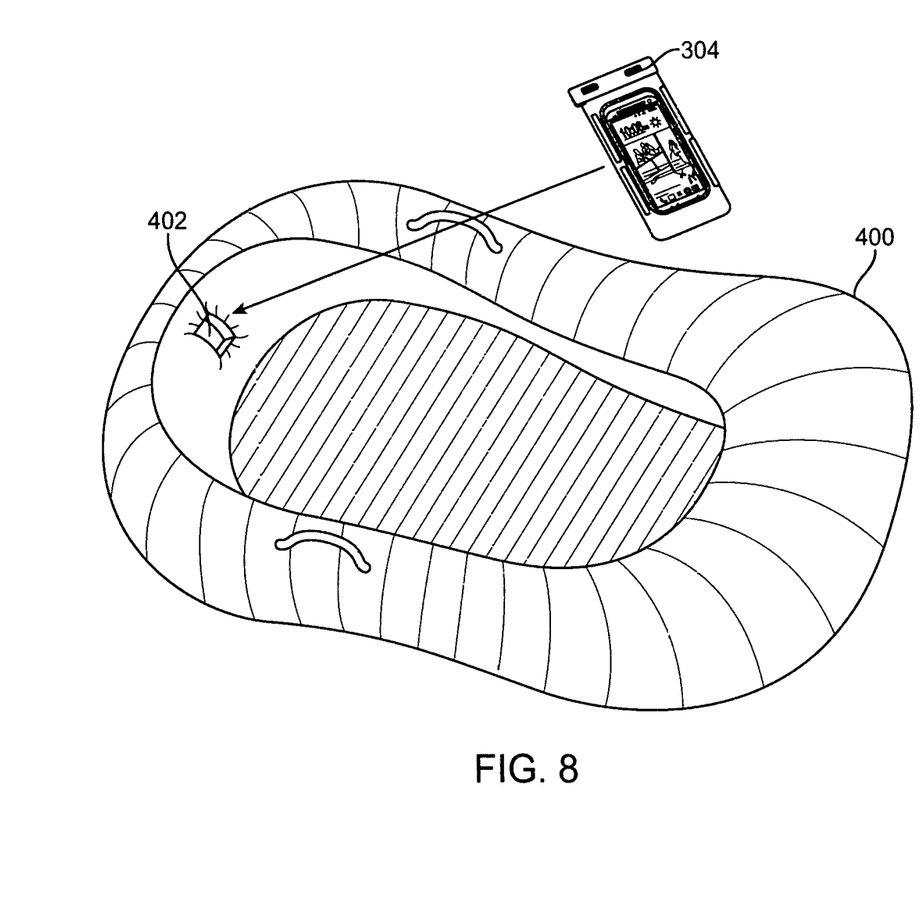
Figure 9:
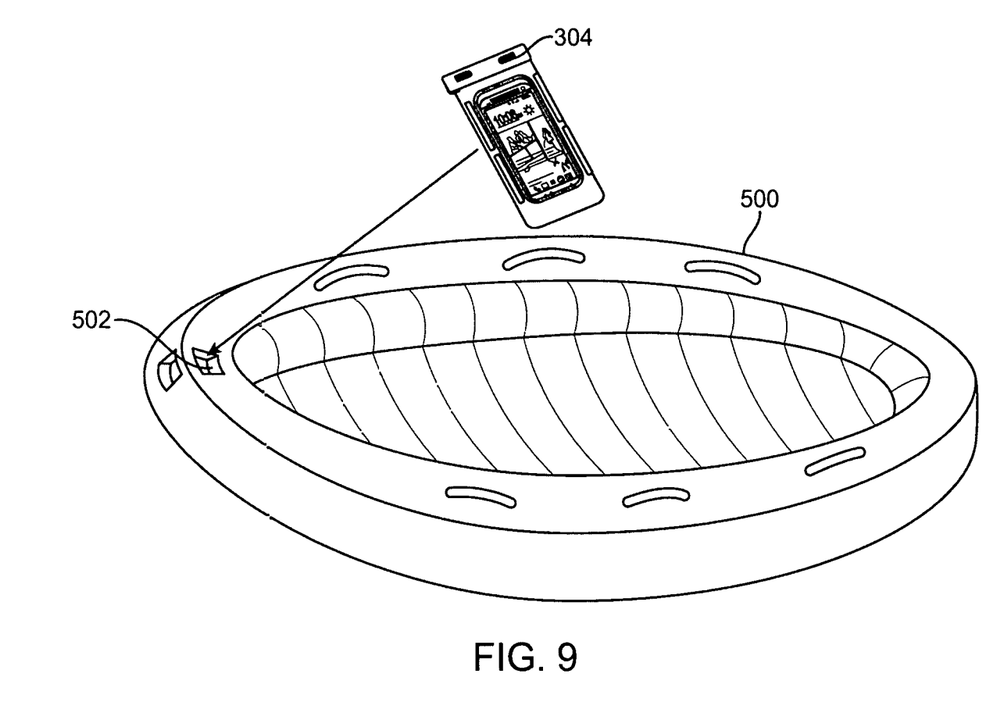

FIGS. 7-9 illustrate exemplary inflatable tube sleds 300, 400, 500, particularly suited for use in waterparks in accordance with one or more embodiments. A waterpark is an amusement park with facilities (as pools and wetted slides) for aquatic recreation such as, e.g., Six Flags White Water waterpark and many others. The inflatable tubes 300, 400, 500, each include a built-in retainer 302, 402, 502 for a removable waterproof smartphone holder 304, which allows users to safely and conveniently take selfie pictures or videos while riding the tube in a waterpark ride. In addition to selfies, users can also take ahead-looking pictures and videos, i.e., of what they see during the ride, by simply switching to the rear camera mode of the smartphone. Also, by using front-back apps downloaded on smartphones, users can simultaneously take videos and pictures of themselves and what they see, which will be shown on different parts of the screen display.

In one or more embodiments, users can purchase, rent, or otherwise obtain a specially-designed waterproof smartphone holder (e.g., case or pouch) at the waterpark. One non-limiting example of such a smartphone holder 304 is further illustrated in FIG. 10. The waterproof smartphone holder 304 is designed to securely lock into a retainer 302, 402, 502 built in the tubes 300, 400, 500 of various rides at the waterpark.

In one exemplary operation in accordance with one or more embodiments, a user activates the camera of his or her smartphone 24 while in the waterproof holder 304, inserts the holder 304 into the retainer 302, 402, 502 built into the tube 300, 400, 500, experiences the ride while the smartphone 24 is recording, and then removes the smartphone holder 304 out of the tube when the ride is done. The user can now take the smartphone holder 304 (containing his or her smartphone 24) to the next ride at the waterpark to be used there.

When being used, the smartphone is recessed in the inflatable tube to protect it from impacts. Portions of the front or back of the smartphone holder can be covered by portions of the inflatable tube or padding as previously described for further protection.

Figure 10:
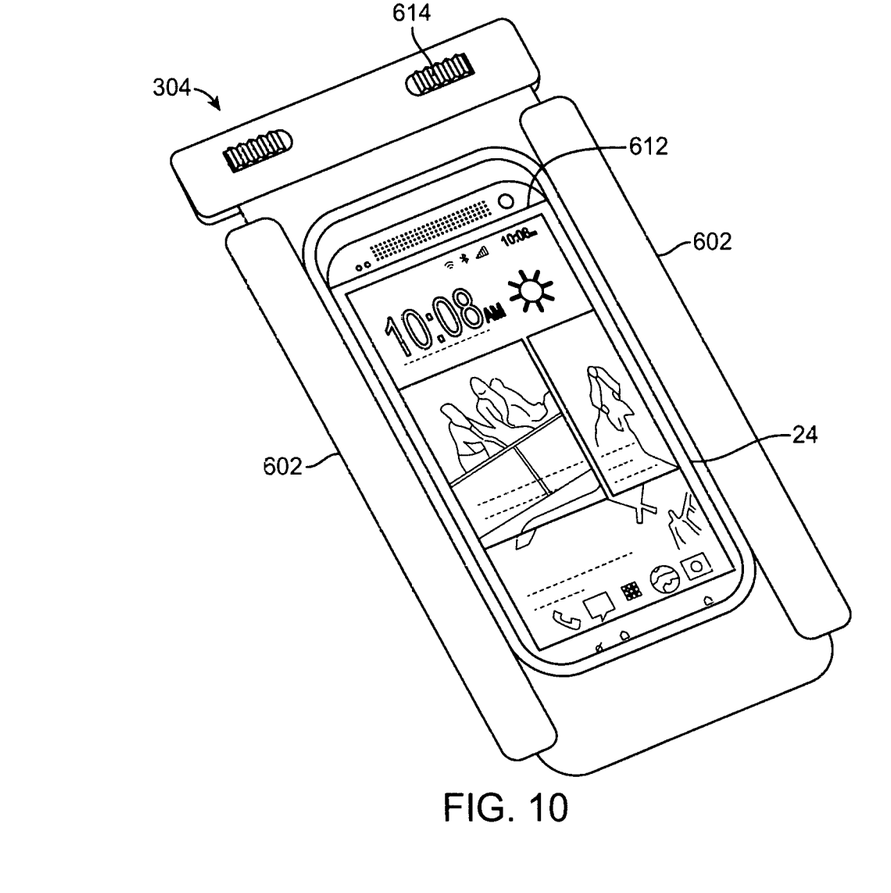
FIG. 10 illustrates an exemplary removable smartphone holder in accordance with one or more embodiments.
Figure 11:
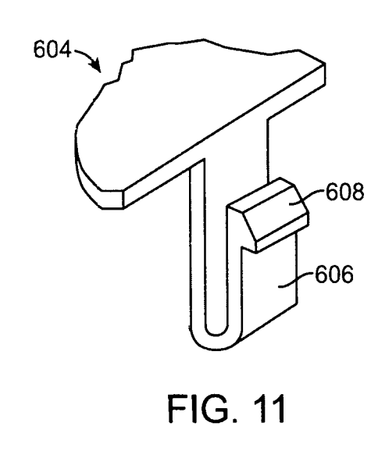
FIG. 11 illustrates a portion of an exemplary latching mechanism of a smartphone retainer in accordance with one or more embodiments.

The smartphone holder 304 is securely (but removably) locked into the built-in retainer 302, 402, 502 in the tube 300, 400, 500 using a secure retaining mechanism such as, e.g., a latch mechanism or snap fastener. The exemplary smartphone holder 304 includes edge features 602 on opposite sides thereof that can engage with a pair of cantilever beam latching elements 604 forming part of the retainer 302, 402, 502 built into the tube. FIG. 11 illustrates one example of such a latching element 604 (only one shown for simplicity), which includes a resilient cantilever beam 606 with an enlarged portion 608 at the end thereof that deflects and snaps against the edge features 602 on the holder 304 when the holder 304 is pushed into the retainer 302, 402, 502. The latching elements are resiliently biased toward engagement with the holder 304, which can be removed by manually deflecting the enlarged portions 608 away from the holder 304 to thereby disengage the latch.

Use of other retaining mechanisms is also possible such as, e.g., a secure Velcro or other hook-and-loop type fastener, a snap fastener, a zipper, or a magnetic fastener. The retaining mechanism is designed to allow users to quickly, securely, and safely lock the smartphone holder 304 into the retainer for the ride, and to easily remove it at the end of the ride.

Figure 12:
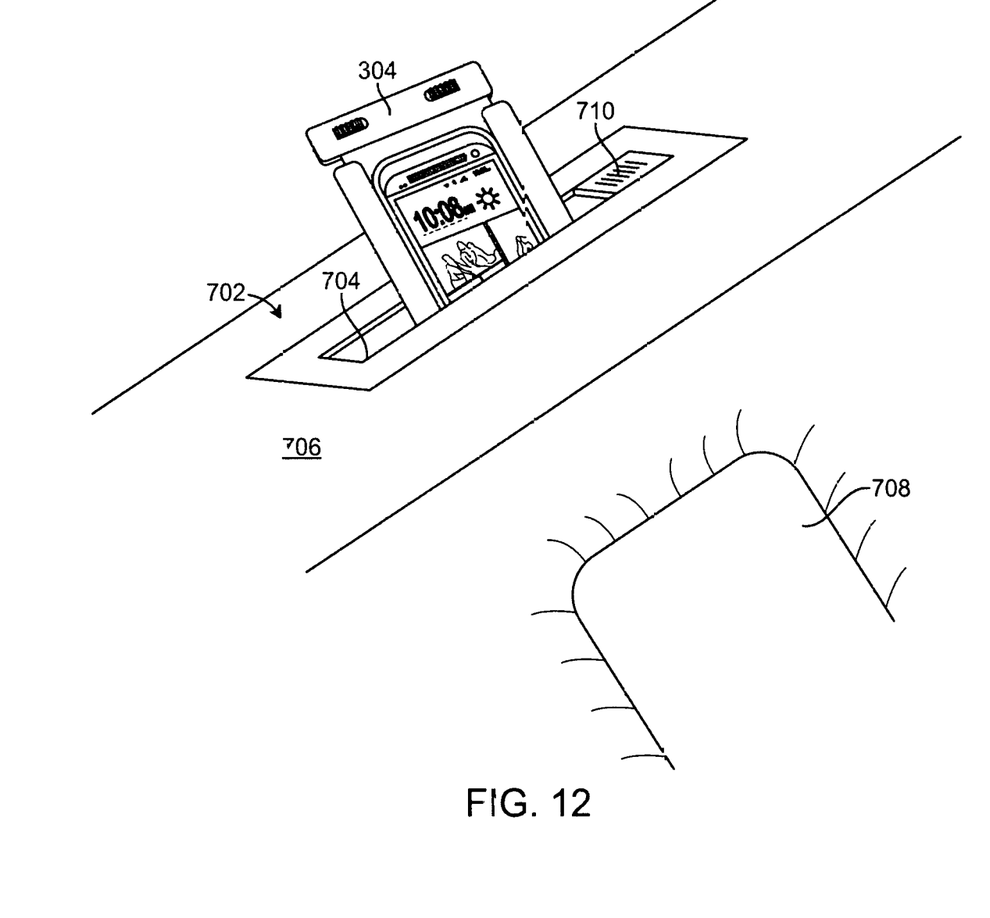
FIG. 12 illustrates an alternative smartphone retaining mechanism in accordance with one or more embodiments.

FIG. 12 illustrates an alternative smartphone retainer 702 built into a tube in accordance with one or more alternate embodiments. The smartphone retainer includes a slot 704 or other opening on an upper surface 706 of the tube leading to an interior space in the tube for retaining the smartphone holder 304. Openings 708 are provided on the inside and/or outside of the tube for exposing the camera lenses of the smartphone and to optionally enable the rider to use the touch screen of the smartphone. The user simply slides the smartphone holder 304 into the slot 704. To facilitate sliding and proper placement of the holder 304 into the slot 704, the retainer 702 can include rail features at opposite sides of the slot 704. The edge features 602 of the smartphone holder 302 can engage and slide along the rail features. In one or more embodiments, a lid 710 may be provided to cover the slot 704 once the smartphone holder 304 has been inserted in the retainer 702. The lid may be hinged at one end of the slot 704 so that it can be flipped between opened and closed positions. As shown in FIG. 12, the lid 710 may alternatively be a sliding lid that can be slid across the slot 704 to close it. The hinged or sliding lids can be spring loaded and resiliently biased toward a closed position.

In one or more alternative embodiments, the retainer can provide a waterproof enclosure for a smartphone, obviating the need for a waterproof smartphone holder.

In accordance with one or more embodiments, the smartphone holder 304 includes an optically clear flexible front surface 612 that covers the screen of the smartphone 24 and allows riders to use the touchscreen functionality of the smartphone 24 while it is in the holder 304. The holder 304 is optically clear at least at portions covering the camera lenses, enabling good quality videos and pictures to be taken while the smartphone is in the holder 304. A seal lock mechanism 614 is provided at the opening of the holder 304 to seal the holder 304 once the smartphone is in place in the holder 304.

The smartphone retainer can be built into the inside of the tube (to enable riders to take selfie videos or pictures), on the outside of the tube (to enable riders to take videos of pictures of what they see or the outside environment), or in a through-window in the tube (to enable riders to do either or both at the same time). Each tube may include multiple smartphone retainers depending on the tube size or capacity. The smartphone retainers may be provided at the front, back, or sides of the tube.

The tube with the built-in smartphone retainer allows park visitors to take exciting action videos and pictures while on rides, enhancing their waterpark experience.

By enabling and encouraging visitors to carry their smartphones with them throughout the waterpark, a visitor presence analytics system can be deployed by waterpark operators, which can collect a variety of real-time visitor data such as, e.g., visitor density, average dwell time, and traffic flows. Waterpark operators can use the visitor data to make real-time decisions such as, e.g., where to best deploy mobile vendors, entertainers, cleaning crews, and other personnel.

Waterpark operators can also make real-time offers to visitors through a smartphone app, e.g., to encourage visitors to go to certain rides or shops.

Waterpark operators can create branded smartphone apps having a variety of innovative features to further enhance the user experience. The following are some examples of many possible app features:

(1) An app to measure the speed of a user on a waterpark ride (using built-in sensors on smartphones), and store and display information comparing the rider's performance with friends or park averages or daily records.

(2) An app to track the user's location at the waterpark to help family and group members easily locate one another using a map of the waterpark on the device.

Figure 13:
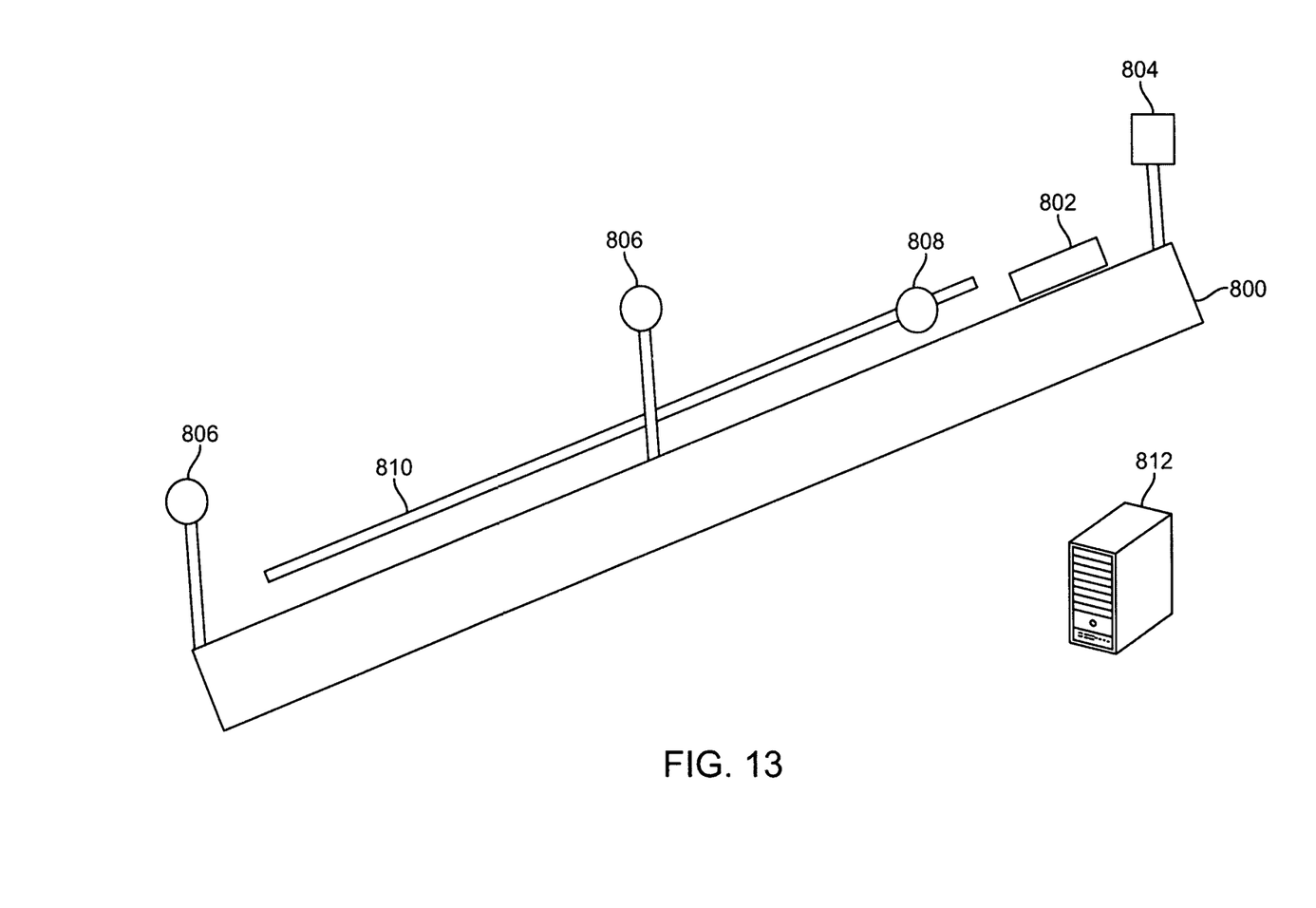
FIG. 13 illustrates a system for capturing videos or images of riders at waterparks using installed cameras in accordance with one or more embodiments.

(3) An app that allows waterparks to transmit images or videos of a rider on a ride captured using one or more remote waterpark camera installed at the ride. FIG. 13 schematically illustrates an exemplary system for capturing videos/images of riders in accordance with one or more embodiments. The ride includes a wetted slide 800 on which a sled 802 with a rider (not shown) travels. Riders can be uniquely identified by the system, e.g., from a Bluetooth, near field communication (NFC) enabled, RFID, or other reader 804 at the start of the ride, which automatically receives signals identifying the rider from the rider's smartphone or other readable user device such as a unique RFID wristband worn by the rider. In one or more embodiments, the system includes one or more stationary cameras 806 mounted at given locations along the slide for taking pictures or videos of the rider during the ride. Alternatively or in addition, the system includes one or more cameras 808 movably mounted on a rail 810 along the slide enabling the camera 808 to follow the rider and capture video/images of the rider during the ride. The cameras 806, 808 and the reader 804 communicate over a wired and/or wireless network with a computer server 812, which receives and processes picture or video signals received from the cameras and rider identification information signals received from the reader. The computer server associates captured video or pictures with riders and makes the video or pictures accessible to the rider's smartphone, e.g., through the app.

In addition to inflatable tubes, smartphone retainers can also be built into foam mats, rafts, and generally any vehicle used in a waterpark ride.

Different smartphone holders can be provided depending on the size or make of the smartphone. However, all holders will preferably fit in a standard retainer built in the various tubes used at the waterpark. In addition to smartphones, waterproof holders can also be provided for use with tablets, GoPro-type cameras, and generally any portable device having one or more cameras.

Smartphone retainers can be designed to hold smartphones in portrait or landscape orientations.

The processes of the computer server described above may be implemented in software, hardware, firmware, or any combination thereof. The processes are preferably implemented in one or more computer programs executing on a programmable computer including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer server system may comprise one or more physical machines, or virtual machines running on one or more physical machines. In addition, the computer server system may comprise a cluster of computers or numerous distributed computers that are connected by the Internet or another network.

Accordingly, the foregoing description and attached drawings are by way of example only, and are not intended to be limiting.

The invention claimed is:

1. A recreational vehicle rideable or otherwise usable by one or more users, comprising:
    a vehicle body including a portion on or in which one or more users may be positioned during use; and
    a window structure in the vehicle body releasably or removably holding an electronic device of one of said one or more users, said electronic device having a forward-facing camera and/or a rear-facing camera, said window structure including one or more open or optically clear areas and a built-in waterproof pocket removably holding the electronic device, wherein at least a portion of the pocket covering a camera lens is optically clear, enabling the one or more cameras to take selfie videos or photographs and/or ahead-looking videos or photographs while positioned in the waterproof pocket and while the vehicle is traveling with the one or more users; and wherein the recreational vehicle is a snow sled, inflatable sliding sled, or an aquatic vehicle.

2. The vehicle of claim 1, wherein the vehicle is inflatable and includes an inflatable tube element, and wherein the window structure is recessed in the inflatable tube element.

3. The vehicle of claim 2, wherein the inflatable tube element extends around at least a portion of a periphery of the vehicle.

4. The vehicle of claim 1, wherein said electronic device is a smartphone.

5. The vehicle of claim 1, wherein the aquatic vehicle is a waterpark float, raft, foam mat, towable, paddleboard, kayak, rowboat, banana boat, or a paddleboat.

6. The vehicle of claim 1, wherein the window structure is positioned in an opening extending through the vehicle body.

7. The vehicle of claim 1, wherein the window structure includes a pivoting mechanism enabling adjustment of a camera angle of the electronic device.

8. The vehicle of claim 1, wherein said vehicle further comprises said electronic device releasably locked in said window structure, said electronic device including a memory having a front-back app stored therein.

9. The vehicle of claim 1, wherein the window structure is positioned in the vehicle body such that the electronic device can simultaneously take selfie videos or photographs and ahead-looking videos or photographs while the vehicle is traveling with the one or more users.

10. An inflatable vehicle usable by one or more users, comprising:
    a vehicle body including a tubular element extending at least partly around the periphery of the vehicle body; and
    a window structure in the tubular element of the vehicle releasably locking therein an electronic device of one of said one or more users, said electronic device having one or more cameras, said window structure including one or more open or optically clear areas enabling the one or more cameras to take selfie videos or photographs and/or ahead-looking videos or photographs while the vehicle is traveling with the one or more users, said window structure being recessed in said tubular element with openings at a front side and/or opposite back side of the tubular element for insertion of said electronic device in said window structure, wherein the window structure includes (a) a built-in waterproof pocket removably holding the electronic device, wherein at least a portion of the pocket covering a camera lens is optically clear or (b) a built-in retainer releasably holding a portable waterproof electronic device holder containing the electronic device.

11. The vehicle of claim 10, wherein the vehicle is a snow sled, inflatable tube, waterpark float, raft, towable, paddleboard, kayak, banana boat, or a paddleboat, and wherein said electronic device is a smartphone.

12. The vehicle of claim 10, wherein the window structure includes the built-in retainer, but not the built-in waterproof pocket.

13. The vehicle of claim 10, wherein the window structure includes the built-in waterproof pocket, but not the built-in retainer.

14. The vehicle of claim 10, wherein said vehicle further comprises said electronic device releasably locked in said window structure, said electronic device including a memory having a front-back app stored therein.

15. The vehicle of claim 10, wherein the window structure is positioned in the vehicle body such that the electronic device can simultaneously take (a) selfie videos or photographs and (b) ahead-looking videos or photographs while the vehicle is traveling with the one or more users.

16. The vehicle of claim 10, wherein the built-in retainer comprises a latching mechanism, a hook-and-loop fastener, a snap fastener, a zipper, or a magnetic fastener.

\* \* \* \* \*